Nov. 5, 1963
T. C. FARRELL ETAL
3,109,382
ROTARY FLUID METER
Filed April 13, 1961
5 Sheets-Sheet 1
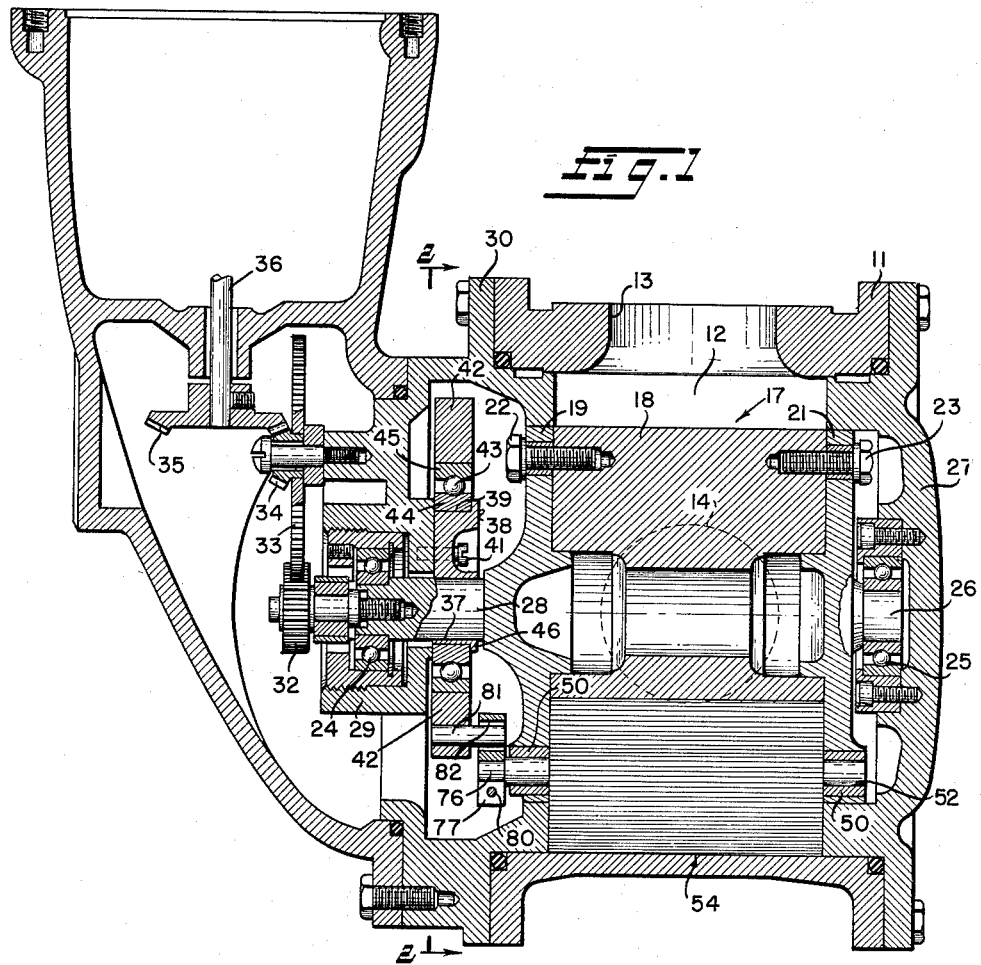
Fig.1
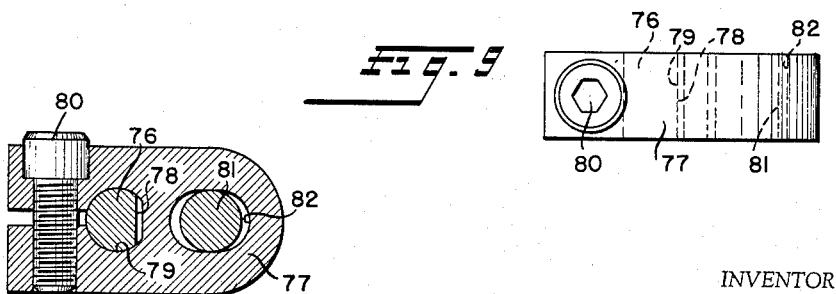
Fig.9
Fig.8
INVENTORS
Thomas C. Farrell
Howard E. Rittenhouse
BY
ATTORNEYS Nov. 5, 1963　　T. C. FARRELL ETAL　　3,109,382
ROTARY FLUID METER Filed April 13, 1961　　　　　　　　　　　　　　5 Sheets-Sheet 2

INVENTORS
Thomas C. Farrell
Howard E. Rittenhouse

BY　*Strauch, Nolan & Neale*
ATTORNEYS

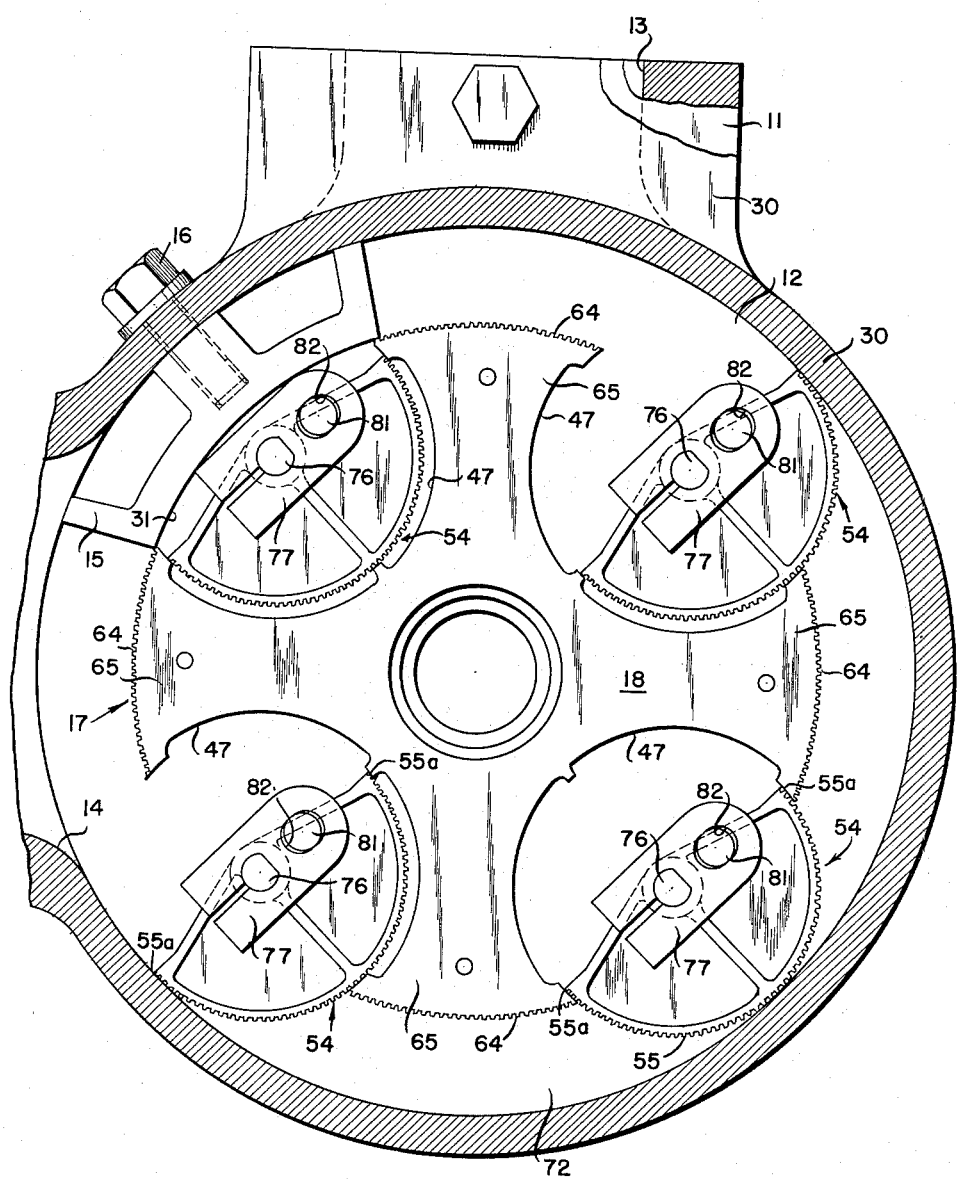

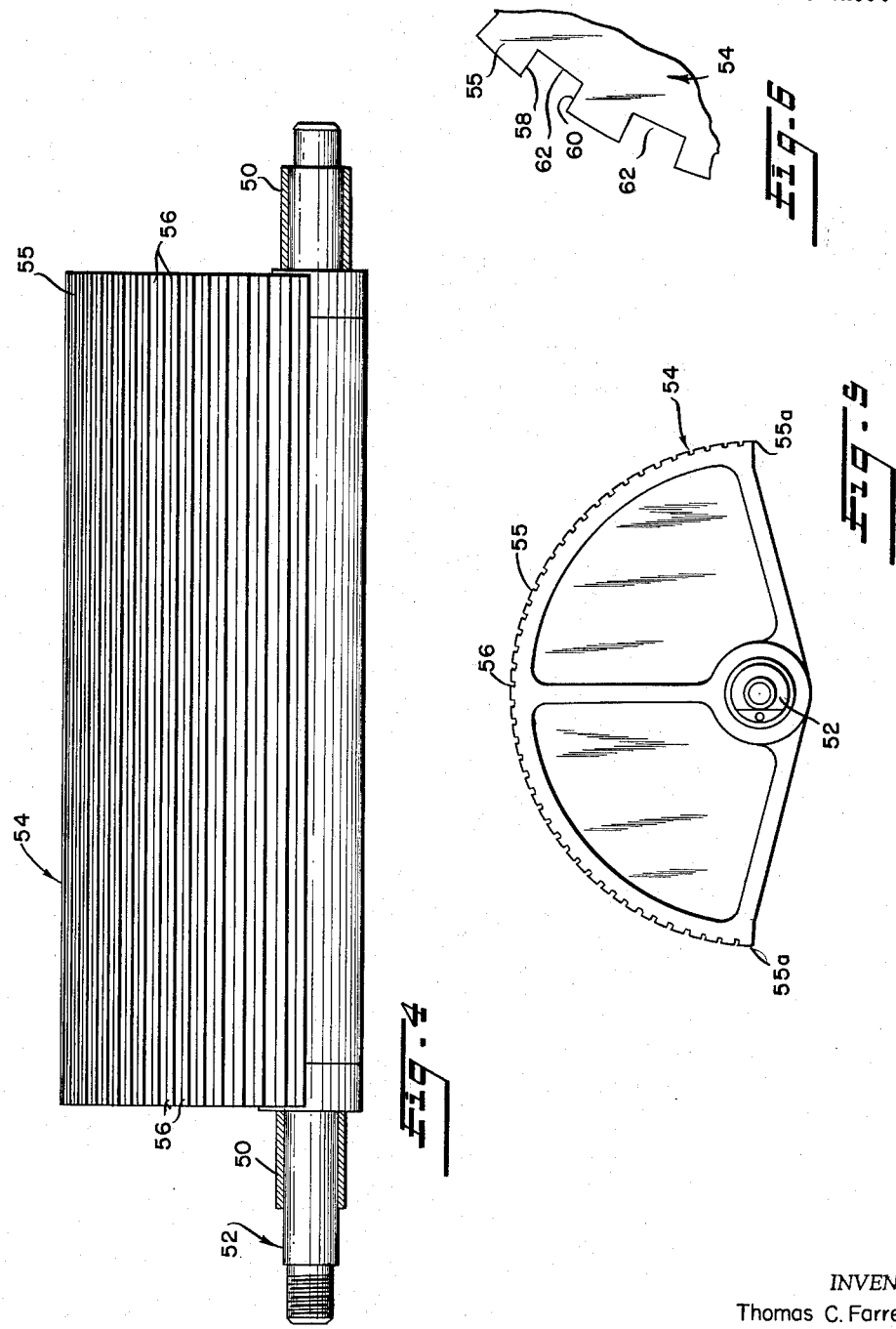

3,109,382
ROTARY FLUID METER
Thomas C. Farrell, Glenshaw, Pa., and Howard E. Rittenhouse, Statesboro, Ga., assignors to Rockwell Manufacturing Company, Pittsburgh, Pa., a corporation of Pennsylvania
Filed Apr. 13, 1961, Ser. No. 102,809
3 Claims. (Cl. 103—143)

This invention relates to improvements in rotary fluid meters, motors, pumps and the like and more particularly to those of the positive displacement type.

In devices of this type there is provided a casing having a measuring chamber within which a rotor is journalled, the rotor having a plurality of peripheral pockets or recesses in which pivoted vanes are positioned that rotate with the rotor, but are so controlled that they always face in the same direction. The vanes are generally of semi-cylindrical form and journalled for movement upon their own axes with respect to the rotor. Generally the diameter of each of the semi-cylindrical vanes is such that in its extended position it provides a running clearance with the cylindrical wall of the measuring chamber and also with a wall of a semicylindrical recess in the periphery of the rotor. The length of the vanes is such that each provides a similar running clearance with the flat ends of the measuring chamber.

In operation of these prior art constructions when used as a meter, the vanes which project into the measuring chamber form spaces of equal volume between adjacent vanes and the measuring chamber wall. Theoretically, these spaces are effectively sealed so that equal volumes of liquid are always released to the meter outlet as the rotor turns through a predetermined angular distance. By this structure, the number of turns which the rotor makes is theoretically proportional to the volume of liquid passing through the meter.

In actual practice, however, the metering accuracy of these prior conventional constructions is not high since an effective seal between the vanes and the wall of the measuring chamber and also between the vanes and the rotor cannot be readily achieved. Consequently, leakage occurs through the running clearance which exists between these relatively moving meter parts with the result that unequal volumes of liquid are released to the meter outlet. Thus, it is clear that with these prior art meter constructions, the number of rotor turns do not accurately reflect the amount of liquid passing through the meter.

The above described meter constructions are usually provided with a division plate which separates the adjacently disposed meter inlet and outlet parts. The division plate is contoured to have an inner peripheral surface interfitting with and having a running clearance with the rotor. This structure constitutes a further source of leakage since some fluid is continuously being by-passed between the rotor and the division plate directly from the meter inlet to the meter outlet.

It will be appreciated that the amount of liquid by-passed in this manner is not measured by the number of rotor turns since it does not pass into the meter measuring chamber. Consequently, this leakage further attributes to a reduction in metering accuracy.

Accordingly, if worthwhile metering accuracy is to be obtained with these prior art metering constructions of the type described above, the running clearances between the rotor, the vanes and the walls of the measuring chamber must be minimized in order to reduce the rate of unmetered leakage occuring between these relatively moving parts. While the machining of the rotor and stator parts of the prior meters with extremely close tolerances serves to reduce the running clearances to some extent, it will be appreciated that the cost of manufacture is correspondingly and substantially increased. It is equally clear that the amount which the running clearance can be reduced to is limited by possible interference of the rotor parts with the stator parts during operation as a result of manufacturing imperfections and oscillation produced by play or wear in supporting bearing surfaces. One particular point of potential interference in the above described construction is where the vanes passing the division plate tends to tip out of its pocket to strike the division plate as the rotor turns.

Accordingly it is the primary purpose of the present invention to substantially eliminate fluid leakage between the relatively moving stator and rotor component metering parts without necessitating extremely close running fits. This is accomplished in accordance with the present invention by providing serrations or longitudinal recesses in at least one of each pair of relatively moving metering surfaces of the meter. In the present embodiment, it is proposed to provide the semi-cylindrical peripheral portions of the vanes and the peripheral portions of the rotor adjacent the meter casing with longitudinal serrations which extend parallel to the axis of rotation of the rotor. These serrations function to establish a turbulent flow pattern which create a fluid seal between the relatively moving parts of the meter and further function to provide for pockets in which foreign matter such as sand particles may be deposited. By this construction, fluid is prevented from by-passing from the intake port to the discharge port in the stator of the meter thereby providing for greatly improved metering accuracy with the necessity of maintaining close tolerances between the stator parts and the rotor parts of the meter. Further, by depositing the impurities and foreign matter, the possibility of the meter becoming clogged or damaged is greatly reduced since the foreign particles are trapped in the pockets formed by the serrations and conveyed to a point of discharge. Thus, large particles of adbrasive are precluded from entering close fitting rotor bearings and the rate of wear of the meter components is thus greatly reduced while at the same time, the accuracy of the meter is greatly improved.

It is therefore a primary object of the present invention to provide a new and improved meter, motor, pump or the like wherein novel means are employed to substantially prevent leakage between the relatively moving component stator and rotor parts of the meter.

A further object of the present invention is to provide a novel structure to lower the cost of the meter, to increase the operating life thereof, and to improve the metering accuracy thereof.

It is a further object of the present invention to provide a novel meter or the like wherein means are employed to establish a turbulent fluid seal between the surfaces of the relatively moving component meter parts.

More specifically, it is the object of the present invention to provide a meter or the like having a casing defining a measuring chamber, a rotor journalled in the chamber and formed with peripheral pockets, and semi-circular vanes positioned in the pockets to rotate with the rotor wherein the semicylindrical peripheral surfaces of the vanes are provided with serrations or longitudinal recesses extending parallel to the axis of rotation of the vanes and wherein the peripheral surfaces of the rotor extending between its pockets are formed with serrations or longitudinal grooves extending parallel to the rotor rotational axis.

A further object of the present invention is to provide a meter according to the preceding object wherein the interior peripheral surface of the casing is formed with longitudinal serrations or grooves extending parallel to the axis of the rotor.

Still a further object of the present invention is to provide a meter according to any of the two preceding objects wherein the serrations are all uniform and the width of each serration is approximately twice the depth thereof.

A further specific object of the present invention is to provide a novel meter or the like wherein foreign particles contained in the fluid passing through the meter are trapped and conveyed out of the meter without clogging or otherwise damaging the component parts thereof.

Further objects will appear as the description proceeds in connection with the appended claims and annexed drawings where:

FIGURE 1 is a longitudinal section through a positive displacement meter according to a preferred embodiment of the invention;

FIGURE 3 is an enlarged fragmentary section showing the relative vane positions;

FIGURE 4 is an enlarged elevational view of the vanes shown in FIGURE 3;

FIGURE 5 is a left hand end view of the vane shown in FIGURE 4;

FIGURE 6 is an enlarged fragmentary view of the vane in FIGURE 5 and showing the serrations in the semi-cylindrical vane periphery;

FIGURE 8 is an enlarged cross-section of a crank used in FIGURES 1 and 2;

FIGURE 9 is a top elevation of the crank of FIGURE 3;

Figure 2:
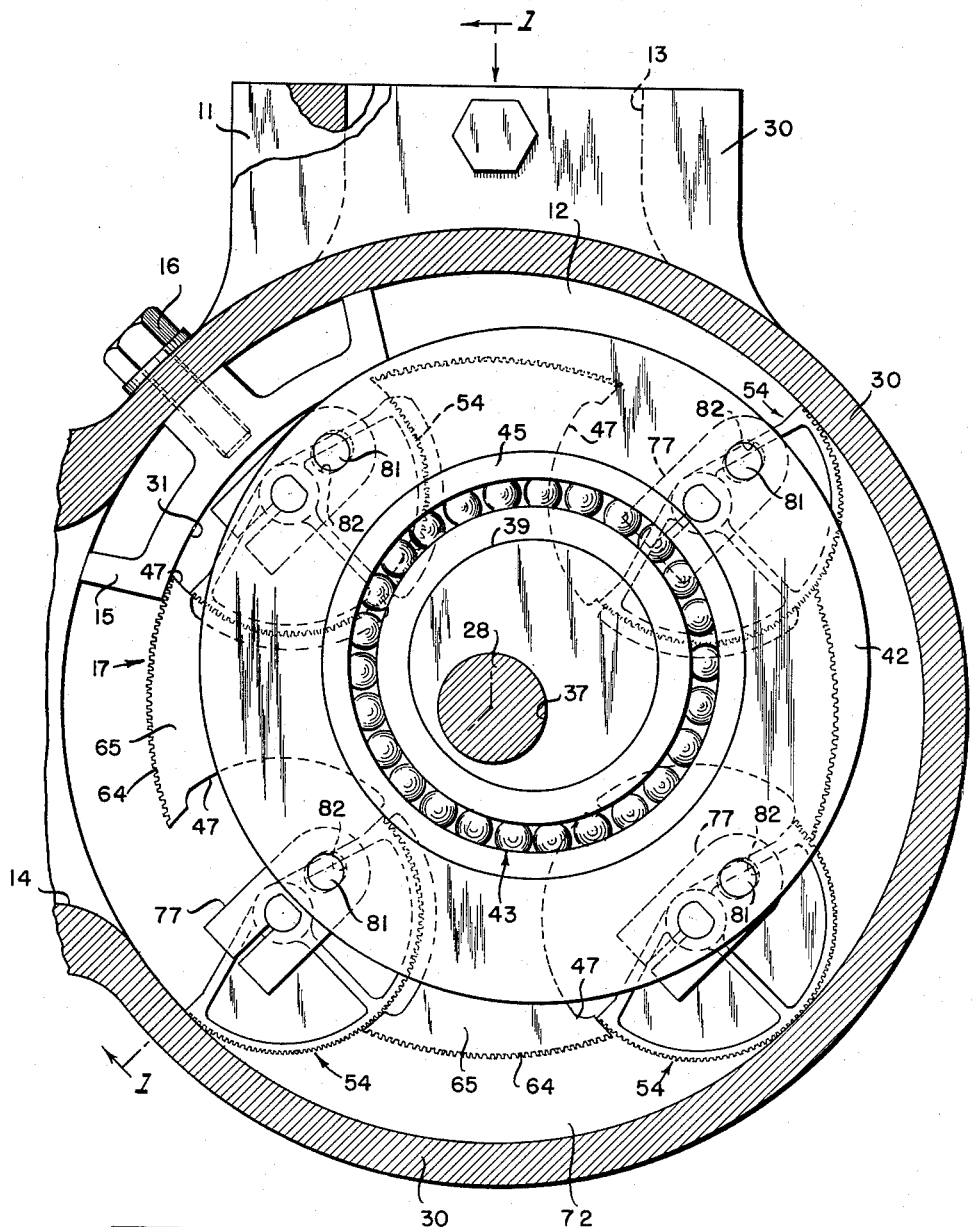
FIGURE 2 is an enlarged section along lines 2—2 of FIGURE 1 showing the control member mounting for the rotor vanes and the division plate of the meter illustrated in FIGURE 1.

Referring now to the drawing, and more particularly to FIGURES 1–3, the disclosed meter comprises a casing 11 housing a cylindrical walled measuring chamber 12 with a fluid inlet port 13 spaced from an outlet port 14 by a division plate 15 (FIGURE 2) fixed to the casing as by one or more bolts 16. Within casing 11, is a rotor 17 which comprises a solid body 18 having a cylindrical peripheral surface flanked by side members 19 and 21 secured thereto as by bolts 22 and 23, respectively, and which is mounted for almost frictionless rotation in concentric ball bearings 24 and 25. A stub shaft 26 rigid with side member 21 is mounted in bearing 25 carried by casing end closure plate 27. A drive output shaft 28 coaxial with shaft 26 is mounted in bearing 24 carried by an internal web 29 of the other casing end closure 30. The cylindrical inner surface 31 (FIGURE 2) of the division plate 15 has a running fit with the cylindrical periphery of rotor body 18.

Rigid with shaft 28 is a small gear 32 connected through a gear train 33, 34 and 35 to a register drive shaft 36. This drive is conventional.

Shaft 28 extends freely rotatably through the cylindrical bore 37 of an eccentric control element 38 which has an external cylindrical surface 39 eccentric to shaft 28. Element 38 is fixed to the meter casing as by one or more screws 41 securing it to web 29.

An annular vane control member 42 is rotatably mounted on eccentric surface 39 by a ball bearing assembly 43, the inner race 44 of which is fixed to eccentric 38 as by force fit and the outer race 45 of which is fixed within annular member 42 as by force fit. Bearing assembly 43 is held against axial displacement on eccentric 38 by contact with web 29 on one side and an integral flange 46 on the eccentric overlapping inner bearing race 44 on the other side.

With reference to FIGURE 3, rotor body 18 has four circumferentially equidistantly spaced peripheral pockets 47 the opposite sides of which are closed by the parrallel flat inner surfaces of rotor side members 19 and 21.

Each of the end plates 19 and 21 carries four identical bushings 50 of bearing material in apertures spaced at 90° along a common circumferential line so that each bushing on one end plate axially aligns with a bushing on the other end plate. Rotatably supported in bushings 50 are the opposite ends of vane shafts 52 on which semi-circular vanes 54 may be separately secured or integrally formed.

As best shown in FIGURES 4 and 5, each vane 54 is preferably of one-piece construction and is preferably of light metal cast about shaft 52.

The semi-cylindrical peripheral surface 55 of each vane 54 has opposite parallel straight edges 55a and is formed with uniform longitudinal serrations or grooves 56 which extend parallel to edges 55a and to the axis of rotation of the vanes and which are equally spaced apart about the entire periphery of the vane.

As best shown in FIGURE 6, serrations 56 are formed with substantially parallel flat side walls 58 and 60 and a flat bottom wall 62 extending perpendicularly between side walls 58 and 60.

Figure 7:
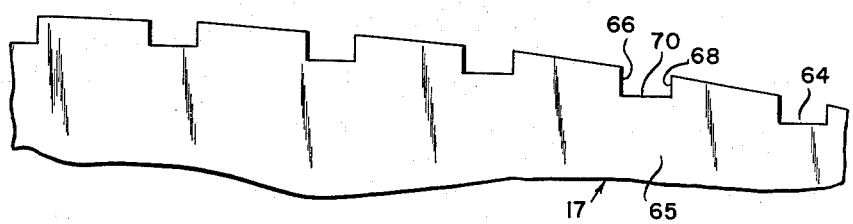
FIGURE 7 is an enlarged view showing the serrations in the rotor body of the meter shown in FIGURE 3.

Similar uniform longitudinal serrations or grooves 64 are formed over the entire outer peripheral portions 65 of rotor body 18 extending between pockets 47 in parallel relationship to the axis of rotation of rotor 17 as shown in FIGURES 2 and 3. With reference to FIGURE 7, serrations 64 are equally spaced apart and are formed by opposed parallel side walls 66 and 68 and a flat bottom wall 70 extending perpendicularly between side walls 66 and 68. All of the side walls 66 and 68 individual to each rotor body portion 65 are parallel to each other and the bottom walls 70 are all parallel to a line which is tangent to the circumference of rotor body 18 at a point substantially bisecting the rotor body portion 65. Each of the serrations 56 and 64 are preferably dimensioned so as to have a width that is substantially twice the depth. By this 2:1 ratio of width to depth, unexpected results are achieved as will presently become apparent.

Serrations 64 coact with division plate 15 and serrations 56 coact with rotor 17 and casing 11 to form pockets in which impurities and foreign matter deposited during operation of the meter. The foreign matter trapped in serrations 56 and 64 are conveyed through the meter and ultimately passed into the annular space 72 between rotor 17 and casing 11.

Serrations 56 and 64 are properly proportioned in depth and width as above described to establish fluid turbulence between vanes 54, rotor 17 and casing 11 and between rotor 17 and division plate 15. The turbulence thus created, effects a positive seal between the relatively moving stator and rotor parts of the meter and the flow pattern is referred to as a "turbulent seal" which substantially reduces the leakage which escapes without being metered through the running clearance between rotor and stator meter parts.

By this structure, any potential trouble due to entrained particle in the flow is eliminated as well as eliminating the necessity of manufacturing casing 11, rotor 17, vanes 54, and division plate 15 with close tolerances for the purpose of improving the accuracy of the meter. The "turbulent seal" substantially eliminates the leakage effect of the clearances between vanes 54, rotor 17, casing 11 and between division plate 15 which would otherwise cause a reduction in the accuracy of the conventional type of meter. As a result, the spaces between adjacent vanes 54 projected into measuring chamber 12 are positively sealed to assure the release of equal volumes of liquid to outlet 14 as rotor 17 turns through arcs of 90°. The 2:1 ratio of serration width to depth provides for optimum turbulence while at the same time providing adequate space during normal operation for deposits of foreign matter.

In establishing fluid turbulence between the relatively moving meter parts, it is also highly important to make the width of serrations 56 and 64 relatively small in proportion to the peripheral surface being covered so that a relatively large number of closely spaced serrations can be formed on each peripheral surface. To this end, serrations that are too widely spaced apart or formed too deeply will not create sufficient turbulence to effectively seal the running clearances between the relatively moving meter parts. In the present invention, approximately 7 serrations per inch of circumference on approximately 8 inch diameter establishes sufficient turbulence to effectively seal the running clearances where the ratio of serration spacing to serration width is approximately 2:1.

With reference now to FIGURE 2, one rotor shaft section 52 of each vane extends into the closure 30 and is further reduced as indicated at 76 for mounting a crank arm 77. As shown in enlarged FIGURE 8, shaft end 76 has a side flat 78 and fits within a similarly shaped bore 79 at the bottom of the split end of crank arm 77 and when bolt 80 is tightened, the crank arm is fixed rigidly on the end of the vane shaft 52 in a predetermined angular relation with respect to the vane.

A plurality of circumferentially equidistant cylindrical pins 81 are fixed on control member 42 to project axially toward the rotor and enter the aperture 82 in each crank arm 77. Apertures 82 have a width equal to the diameter of pins 81 for smooth sliding fit with pins 81 longitudinally of each crank arm and a length greater than the diameter of pins 81 to provide lost motion for a purpose to appear.

The distance between the center of each vane shaft 52 and its adjacent pin 81 is effectively equal to the distance that member 38 is eccentric to shaft 28, for a purpose to appear.

FIGURES 2 and 3 show the parts in their relative operational positions when one vane 54 is passing the division plate 15 during rotation of the rotor. As fluid enters at 13 it strikes the vane 54 at the upper right in FIGURE 3 and the rotor 18 is turned about its axis thereby carrying with it all of the vanes. As the rotor turns, the crank arm connection of the vanes with rotatable control member 42, which rotates with the rotor, maintains each of the vanes 54 in the same orientation with respect to the division plate, with crank arms 77 and vanes 54 rocking 90° in the same direction in every quadrant and arms 77 always maintaining parallelism. Thus, by precise control of the positions of vanes 54 and by establishment of the "turbulent seal" herein before described, the spaces between the three vanes projected into the measuring chamber 12 are in effect sealed so that the same volumes of liquid are released to the outlet 14 as the rotor turns through each 90° and the register driven shaft 36 indicates volume in proportion to rotor turns.

In the invention each of the parallel crank arms 77 always extends in the same direction which is substantially parallel to the diametral plane of the vane surface 55 that contains the opposite parallel straight edges 55a of the respective vane surface.

As shown in FIGURES 2 and 3, the inner surface 31 of the division plate is of cylindrical contour about the axis of shaft 28, and the opposite edges 55a of the vane passing are maintained substantially parallel to a chord perpendicular to a radial plane bisecting that surface to avoid striking it as the rotor rotates.

In the invention where the crank arms 77 are disposed parallel to the diametral plane of the vane surface as described, the maximum vane tipping occurs in the vane extended positions 90° from the division plate where such tipping is not as critical as at the division plate. The amount of vane tipping at the division plate position is equal to the ratio of effective crank arm length to the vane surface radius times the segment height of the pin 81 in moving from the true center to the side of the elongated aperture 82.

As a result of the turbulent seal between the rotor and stator meter parts, the invention therefore permits larger machine tolerances in the manufacture of the eccentric and the crank arm connections, and results in longer meter life because greater wear can be permitted in the mechanism and bearings before the vane tipping becomes so large that the vane edge will strike the division plate during turning movement of the rotor.

Figure 10:
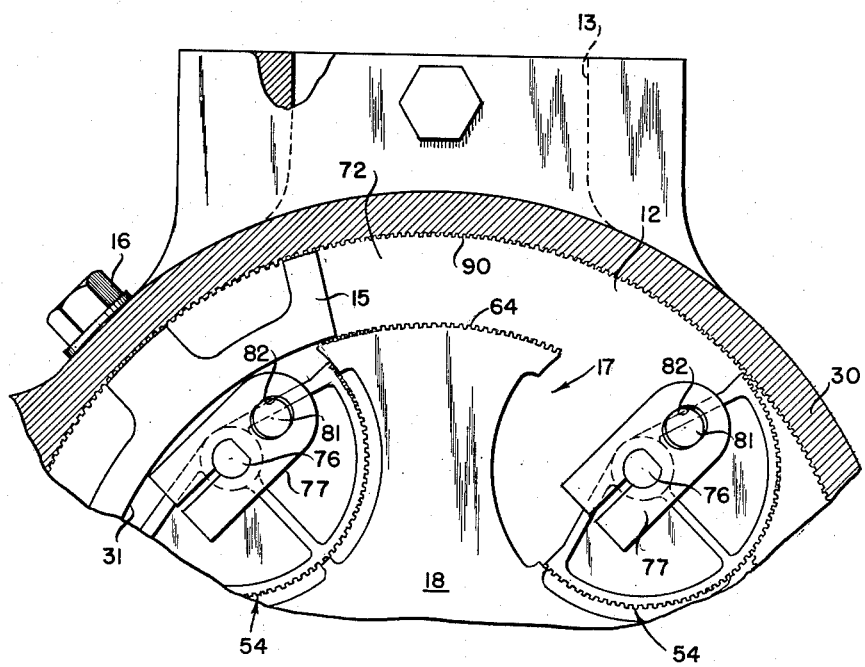
FIGURE 10 is a fragmentary section similar to FIGURE 3 and showing a further embodiment according to the present invention.

FIGURE 10 shows a further embodiment which is identical to the embodiment of FIGURES 1–9 except that the inner peripheral surface of casing 11 is provided with uniform equiangularly spaced apart grooves or serrations 90 which extend parallel to the axis of rotation of rotor 17. These serrations 90 are formed similar to grooves 56 and 64, preferably having a width that is twice the depth, and function to further increase the accuracy of the meter by providing additional pockets for deposit of foreign matter and to establish additional turbulence for affecting a more efficient seal with the vanes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter, a casing having an internal cylindrical surface, a rotor mounted for rotation in the casing provided with a cylindrical external peripheral surface concentric with and radially spaced from said casing surface and forming therewith an annular fluid displacement chamber and having a plurality of axially extending equidistantly spaced peripheral surface pockets, a vane mounted in each pocket for rocking movement about an axis parallel to the rotor axis and having a semi-cylindrical surface with diametrically opposite side edges parallel to the vane rocking axis in running clearance with the surface of its pocket, said vanes being adapted to rockingly project into said chamber with a running clearance relative to the internal cylindrical surface of said casing, a division plate mounted in said chamber and having an internal surface in interfitting running clearance with said rotor surface, inlet and outlet ports to said chamber on opposite sides of said division plate, means for rotating said vanes in timed relation with said rotor so that each vane withdraws within its pocket as it passes said division plate and means for establishing fluid turbulence in each of said clearances to effectively seal up said clearances against fluid flow therethrough comprising: means forming a plurality of closely and uniformly spaced serrations over the entire semi-cylindrical surface of each vane in parallel with said opposite side edges and means forming a plurality of closely and uniformly spaced serrations over the entire rotor surface extending between said pockets in parallel relationship to said rotor rotational axis, each of said serrations having a width that is approximately twice the depth thereof, the serrations on said rotor surface each being formed with flat parallel side walls and a flat bottom wall extending perpendicularly between side walls and parallel to a line tangentially touching the rotor surface at a point midway between adjacent ones of said pockets, the ratio of serration width to the spacing between adjacent ones of said serrations on said vanes and said rotor being in the order of 1:2.

2. The meter as defined in claim 1 wherein said casing internal cylindrical surface is formed with a plurality of uniformly and closely spaced serrations extending parallel to the rotational axis of said rotor.

3. The meter as defined in claim 1 wherein the ratio of the number of serrations per inch of circumference to the respective diameters of said rotor and said vanes is on the order of 7:8.

References Cited in the file of this patent

UNITED STATES PATENTS

| | | |
|---|---|---|
| 1,629,202 | Conklin | May 17, 1927 |
| 1,869,053 | Dudley | July 26, 1932 |
| 2,274,206 | Marsh | Feb. 24, 1942 |
| 2,690,869 | Brown | Oct. 5, 1954 |
| 2,811,928 | Dean | Nov. 5, 1957 |
| 2,856,120 | Fawzi | Oct. 14, 1958 |
| 2,863,425 | Breelle | Dec. 9, 1958 |
| 2,908,257 | Congard | Oct. 13, 1959 |
| 2,920,610 | Breelle | Jan. 12, 1960 |
| 2,920,814 | Breelle | Jan. 12, 1960 |